Sept. 16, 1958  E. C. VROMAN  2,851,775
PRUNING SAW
Filed March 13, 1957
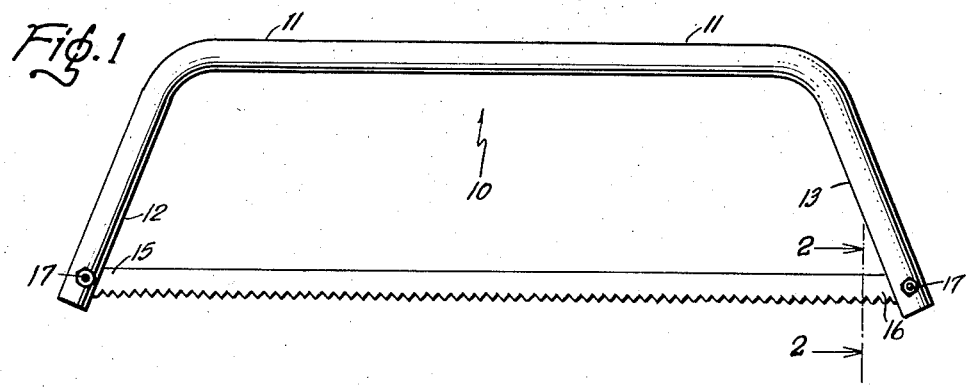
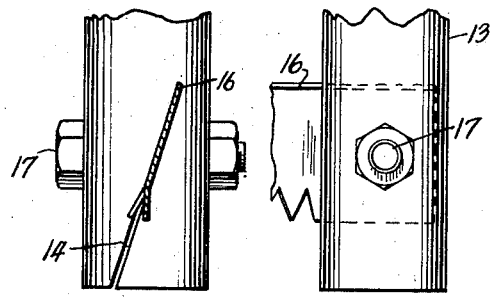
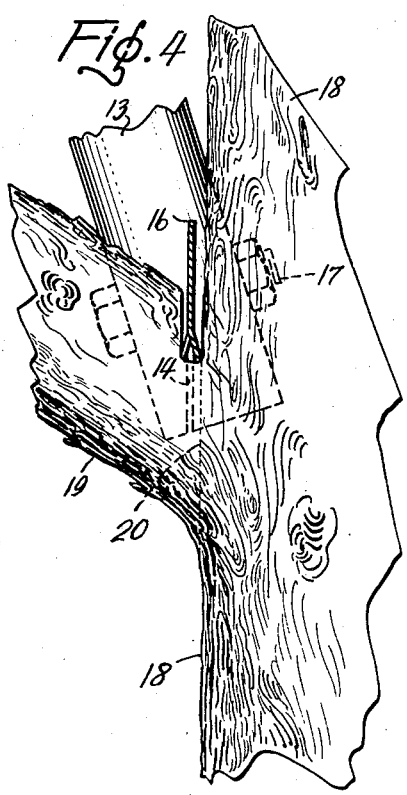
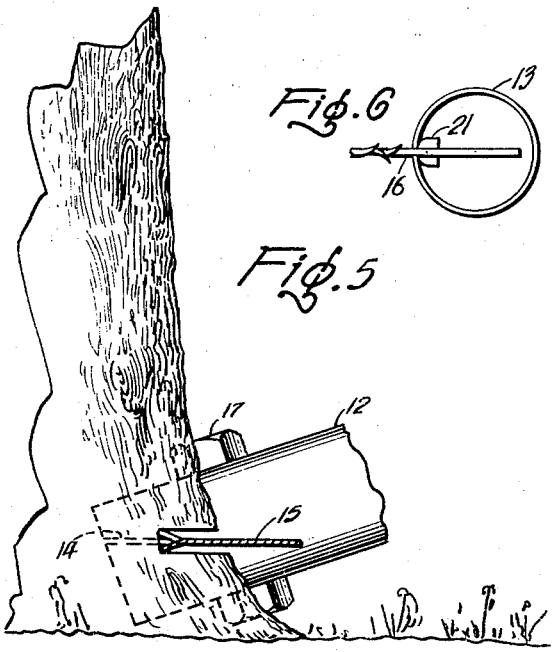
INVENTOR.
Ernest C. Vroman
BY
Andros and Smith
His Attorneys United States Patent Office 2,851,775
Patented Sept. 16, 1958

2,851,775

PRUNING SAW

Ernest C. Vroman, Schoharie, N. Y.

Application March 13, 1957, Serial No. 645,701

3 Claims. (Cl. 30—166)

This invention relates to improvements in saws. More particularly, it has to do with improvements in pruning saws utilizing a bow-shaped spring frame made from a single piece of pipe, the ends of which have canted, aligned bearing surfaces for the saw blade, having means fixedly and rigidly to hold the blade in canted position with respect to the frame, and the provision of such a device is a principal object of the invention.

I am well aware that bow-shaped pruning saws have heretofore been suggested in the patented literature and some have appeared on the market. However, these do not teach the use of a frame that is tubular throughout with a canted saw blade rigidly fixed therein but are complicated and become unstable during use.

Generally, it is an object of the invention to overcome the foregoing difficulties and provide such a saw that is economical of manufacture, simple, but sturdy and durable in construction, and which will operate with relative freedom from wear and tear, and other mechanical difficulties.

More specifically, it is an object of the invention to provide a bow-shaped spring frame for such a saw in which the opposite ends are in alignment with each other, which ends have canted bearing surfaces in alignment with each other for a saw blade, the frame ends and blade having openings therethrough adapted to be brought into alignment with each other when the blade is positioned against the canted bearing surfaces, and means penetrating the aligned openings fixedly to secure a blade in a rigidly canted position in the frame.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a side elevational view embodying the invention;

Fig. 2 is an end elevational view, somewhat enlarged, of a fragmentary portion of one end of the frame and saw blade taken along the lines 2—2 of Fig. 1 and looking in the direction of the arrows;

Fig. 3 is a side elevational view of Fig. 2 looking from right to left thereof;

Figs. 4 and 5 are views illustrating the use of such a saw; and

Fig. 6 is a bottom view showing an alternative means for locking the saw blade in position.

Referring more particularly to the drawing, there is indicated generally at 10 a bow-shaped spring frame made of an elongated, tubular member consisting of a single piece of pipe having a straight center portion 11 with opposite end portions 12 and 13 bent in a direction toward each other and in the same plane with each other and with the straight portion 11.

Canted bearing surfaces in the form of angularly disposed kerfs 14 are located in each terminating portion of the ends 12 and 13, which ends also form opposing handles of the frame. These bearing surfaces, or kerfs, are in alignment with each other to receive opposite ends 15 and 16 of a saw blade in canted position with respect to the frame ends. The frame ends have holes extending transversely therethrough in the area of said kerfs and the blade has a hole adjacent each end adapted to be brought into alignment with the holes in the frame ends. Actually, the distance between the holes in the frame ends are slightly greater than the distance between the holes in the blade ends so that, when the frame ends are slightly sprung toward each other, the holes will be brought into alignment with the holes in the blades, whereupon suitable locking means, such as bolts 17 are passed through the aligned holes and the blade is rigidly and firmly held in fixed position. In inserting such a blade in the frame one bolt is first passed through the aligned holes of the frame end and one end of the blade and it is then a simple matter to spring in the other end of the frame to bring its holes in alignment with the hole in the opposite end of the saw blade and the bolt quickly slipped into position. Such a saw with the blade so canted has several advantages and produces new results. For example, in pruning a tree such as that shown in Fig. 4 at 18, a limb 19 can cleanly be severed flush with the tree trunk as indicated in the dotted line position at 20 because the saw blade passes vertically downwardly since the frame itself is now canted away from the tree trunk without being interfered with to deflect the path of the saw. Also, such an arrangement permits ready use on either or opposite sides of the tree trunk and can be used by either a left-handed or right-handed person with equal facility. Again, as shown in Fig. 5, the saw can similarly be used when cutting trees close to the ground surface.

In Fig. 6 there is shown an alternative means for locking the saw blade in position in the ends 12 and 13, in the form of a U-shaped member 21 that is first inserted in each hole in the ends of the saw blade. One end of the blade with a U-shaped member inserted is then slipped into one kerf 14, the ends 12 and 13 slightly sprung toward each other, and the other end of the blade with the other U-shaped member inserted is then slipped into the other kerf. When the tension on the ends 12 and 13 is removed they will spring back against the bottoms of the U-shaped members which will bear against the inside wall surfaces thereof firmly to hold the blade in operating position. By means of such a member the blade readily and quckly is removable from the handles. Likewise, straight pins in place of the U-shaped members, or in place of the bolts, if smaller in length than the diameter of the tubular portions of the handles, could be used so that the locking member would be wholly concealed or confined within the ends thereof.

It will thus be seen that the objects hereinbefore set forth may be efficiently attained and since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a saw, an elongated, bow-shaped, spring frame, the opposite ends of which are in alignment with each other to provide oppositely disposed handles, one of said handles having a fixed canted bearing surface inwardly extending from its terminating end for one end of a saw blade, and the other end of said frame having a similarly located and fixed canted bearing surface for the opposite end of said blade, and said frame end handles and said blade having openings therethrough adapted to be brought into alignment with each other when said blade is positioned against said bearing surfaces, and means penetrating all of said aligned openings fixedly to secure said blade in canted position, between said handles, with respect to said frame.

2. In a saw, an elongated tubular member comprising a single piece of pipe having a straight central portion, opposite end portions forming handles therefor, said handle portions being angularly bent in a direction toward each other and in the same plane with each other and with said straight portion, an angularly disposed kerf fixed with respect to the frame in each end portion extending inwardly from each handle terminating edge and in alignment with each other to receive the opposite ends of said blade in canted position with respect to said frame, said handle portions having holes extending transversely therethrough in the area of said kerfs, and said blade having a hole adjacent each end adapted to be brought into alignment with the holes in said handle portions, and bolts passing through said handle holes and said blade rigidly and fixedly to hold said blade in canted position with respect to the plane of said handles and said straight frame portion and in substantially parallel relation to the latter.

3. In a pruning saw an elongated member comprising a single piece of pipe having a straight central portion, opposite end portions forming handles therefor, said handles being tubular throughout their length and formed by being angularly bent from said straight central portion toward each other and lying in the same plane therewith, a single kerf fixed with respect to the pipe in each handle in the tubular wall portions thereof facing each other and extending inwardly of the ends thereof to receive opposite ends of a saw blade within the confines of the tubular handles, said kerfs being equally canted in the same direction angularly with respect to the long axis of said pipe, a blade with ends inserted within said kerfs, said blade having a hole adjacent each end, which ends and holes lie wholly within the tubular portions of said handles adjacent their ends, and a locking member passing through the holes in said blade within the tubular portions of the handles adjacent their ends and bearing against said handles to tension the blade when said handles are sprung toward each other and released.

References Cited in the file of this patent

UNITED STATES PATENTS

| 653,947 | Condon | July 17, 1900 |

FOREIGN PATENTS

| 226,157 | Germany | Sept. 28, 1910 |
| 584,073 | Germany | Sept. 14, 1933 |